(12) United States Patent
Brezina

(10) Patent No.: US 11,066,129 B2
(45) Date of Patent: Jul. 20, 2021

(54) TOERAIL GROMMET

(71) Applicant: David C Brezina, Chicago, IL (US)

(72) Inventor: David C Brezina, Chicago, IL (US)

( * ) Notice: Subject to any disclaimer, the term of this patent is extended or adjusted under 35 U.S.C. 154(b) by 166 days.

(21) Appl. No.: 16/504,239

(22) Filed: Jul. 6, 2019

(65) Prior Publication Data
US 2021/0001957 A1    Jan. 7, 2021

(51) Int. Cl.
*B63B 17/04* (2006.01)
*B60N 3/06* (2006.01)
*B63H 9/08* (2006.01)
*B63B 15/02* (2006.01)

(52) U.S. Cl.
CPC .............. *B63B 17/04* (2013.01); *B60N 3/063* (2013.01); *B63B 15/02* (2013.01); *B63H 9/08* (2013.01)

(58) Field of Classification Search
CPC ......... B63B 21/00; B63B 21/04; B63B 21/10; B63B 21/14; B63B 17/00; B63B 17/04; B63B 15/00; B63B 15/02; B63H 9/00; B63H 9/08; B60N 3/06; B60N 3/063
USPC ................................................. 114/113, 218
See application file for complete search history.

(56) References Cited

U.S. PATENT DOCUMENTS

| | | | |
|---|---|---|---|
| 5,477,800 A | * | 12/1995 | Lawrence ............. B63B 21/045 114/218 |
| 8,985,045 B2 | * | 3/2015 | Banfield ................ B63B 21/10 114/218 |

* cited by examiner

*Primary Examiner* — Lars A Olson

(57) ABSTRACT

A grommet has main body fitting in a toerail aperture enabling a fiber lead to run fairly through a bore, the fiber lead contacting a smooth wall surface in both body and a locking plate or member with the main body flange and intermediate portion fitting a toerail being held in place by the locking member or plate, the locking member or plate fitting a boss in the main body.

8 Claims, 2 Drawing Sheets

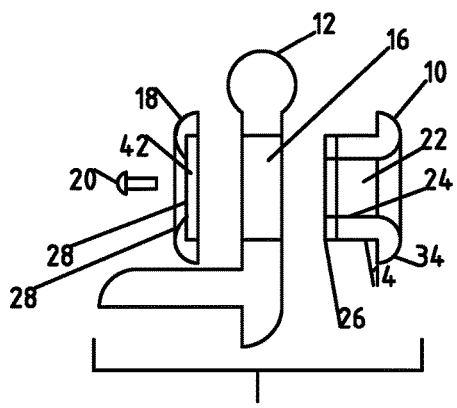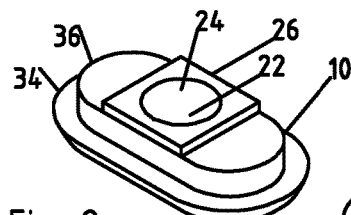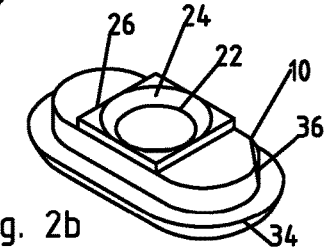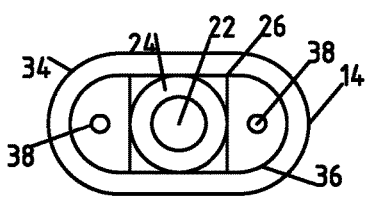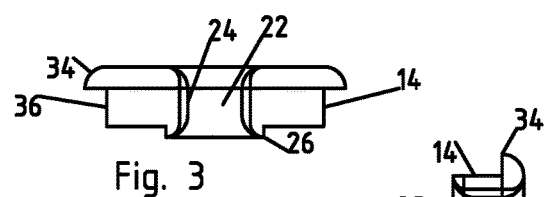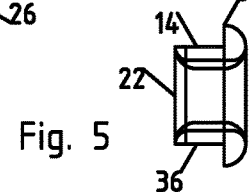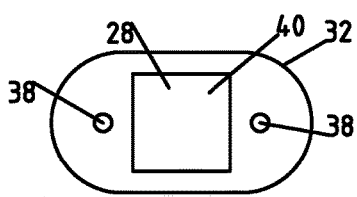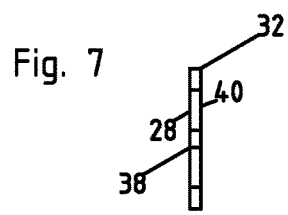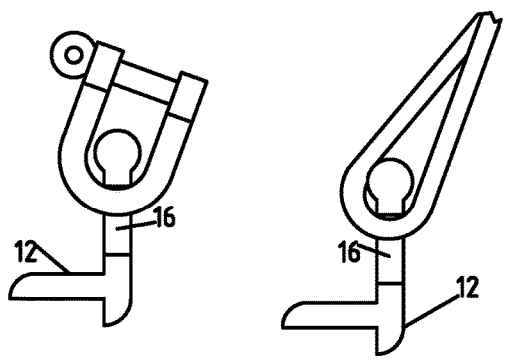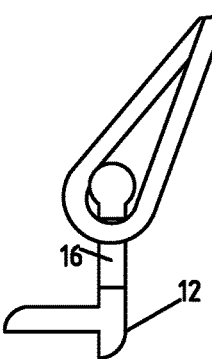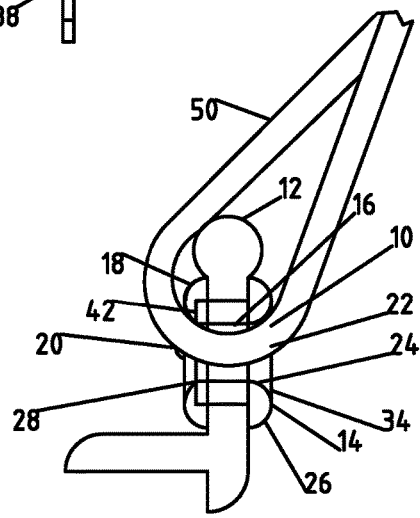

TOERAIL GROMMET

BACKGROUND OF THE INVENTION

Field of the Invention

A grommet fits in an aperture formed in a flat portion of a rigging or structural member so that the sharp edges of the aperture are covered, a smooth surface is provided, and wear on attachments, particularly fiber attachments, is reduced.

Description of Related Art

For many years rigging has been fitted to structural members using rigid metal attachments such as shackles. As an example, sailboats have been fitted with "toerails" formed of aluminum extrusions mounted at the sheer of the boat, where the hull and deck intersect. In order to provide increased options for leading running rigging, the toerails have typically been formed so as to have a series of longitudinally spaced apertures. The apertures permit, for example, blocks for sheets, guys, barber haulers, preveners and the like, to be placed at selected positions to maximize the efficiency of the angle of lead of the sheet or guy.

The use of metal shackles bearing on the metal extrusions causes some wear by virtue of the metal bearing on metal. Typically this is on the toerail, if aluminum, because the typical shackle is steel. This does not adversely affect the shackle and aluminum extrusions can last for many years, even bearing shackles. However, metal fittings, including shackles and blocks, have greater mass than modern synthetic fiber rigging, which can now otherwise perform substantially the same functions at far lighter weight. Fiber attachments to toerail apertures, however, suffer from contact with the edges of the aperture, which are typically simple right angle edges where the inboard and outboard faces meet the transverse surface of the aperture. When the fibers are cut, the attachment is substantially weakened. Accordingly, it is desirable to fit, and particularly retrofit, a grommet to the aperture to provide a smooth and fair bearing surface that enables easy attachment of modern fiber fittings to sailboats.

BRIEF DESCRIPTION OF DRAWINGS

FIG. 1 is a sectional and exploded view of a first embodiment of the grommet being fitted to a toerail.

FIG. 2*a* is a perspective sectional view of a first embodiment of the main body of the grommet.

FIG. 2*b* is a perspective sectional view of a second embodiment of the main body of the grommet.

FIG. 3 is a front elevational view of the main body of the grommet.

FIG. 4 is a top sectional view of the main body of the grommet.

FIG. 5 is a side sectional view of the main body of the grommet.

FIG. 6 is a front elevational view of an alternative locking plate of the grommet.

FIG. 7 is a side sectional view of an alternative locking plate of the grommet.

FIG. 8 is a sectional view of a prior art shackle mounted on a toerail.

FIG. 9 is a sectional view of a prior art fiber lead attached to a toerail.

FIG. 10 is a sectional view of the installed grommet with a fiber lead attached to a toerail.

DESCRIPTION OF PREFERRED EMBODIMENTS

Figure 11:
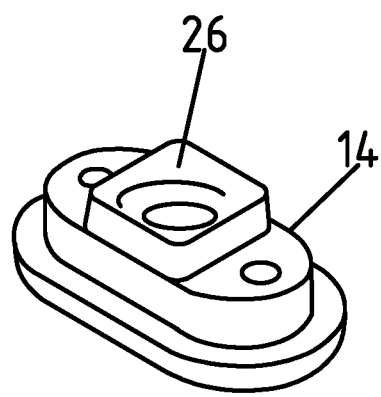
FIG. 11 is a perspective view of a toerail grommet body having a deeper projection.

A grommet 10 is fitted to a toerail 12 to provide a fair lead to rigging attached to the toerail 12. In the preferred embodiment a main body 14 fits in an aperture 16 and the grommet 10 captures the toerail 12 by fitting a locking member or plate 18 to the main body 14. A pair of fasteners 20 is preferred, but adhesives or, in the case of a round aperture, threading the main body and locking member could be used.

FIGS. 2*a* and 2*b* illustrate alternative embodiments that vary mainly based on what locking member or plate 18 will be used. The first embodiment in FIG. 2*a* has a bore 22 that extends through body 10 having its wall 24 extend through to the surface of boss 26. This utilizes opening 28 of locking member 18 having curved surface 30 to provide a fair lead inboard. FIG. 2*b* anticipate a flat locking plate 32 and accordingly bore 22 as a curved surface for wall 24 exiting boss 26. The flat mounting plate 32 simply captures boss 26 and does not itself provide any fairlead. Thus, the embodiment shown in FIGS. 3, 4 and 5 could be modified to correspond to that shown in FIGS. 1 and 2*a*, if the locking member 18 is used. The geometry could be adapted consistent with these principles for particular needs such as clearance on deck, manufacturing methods and material properties. For example, but not by way of limitation, in high volume production, it may be useful to confine all the complex shape in a single member, such as FIG. 2*a* and simply stamp plate 32, while if materials lending themselves to molding, casting or CNC milling were used, the preferred embodiment having locking member 18 and body 14 having complex shapes, as shown in FIGS. 1 and 2*a* could be more desirable.

In particular, the flat mounting plate 32 could be a flat plate of a high strength material such as stainless steel, while the locking member 18 of FIG. 1 could be cast or forged of a material such as aluminum.

Figure 12:
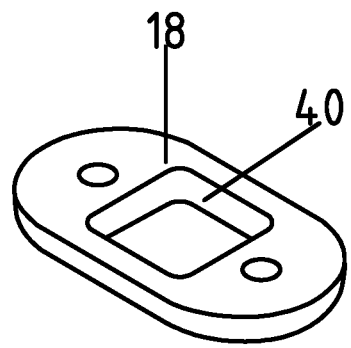
FIG. 12 is a perspective view of a toerail grommet flange having a deeper receptacle to receive the projection of FIG. 11.

However, if molded plastic were used, the locking member or plate 18 could be configured more thickly, such as in FIG. 12, the lighter weight permitting and material strength requiring, greater thickness. Boss 26, as in FIG. 11, could be slightly tapered for greater tolerance and filletted or radiused edges and corners in FIG. 11 and FIG. 12 could reduce stresses.

Body 14 is formed to have an outboard flange 34, and intermediate portion 36 with boss 26 extending inboard on intermediate portion 36. The terms inboard, outboard, and the like, are relative and consider the mounting on toerail 12 shown in FIG. 1, and are relative to the position of toerail 12 on a sailboat. Grommet 10 could be mounted in different orientation relative to inboard, outboard or even fore and aft, and along a curved sheer, the terminology being for description, not by way of limitation. Indeed, depending on expected loads, the normally outboard position of FIG. 1 could be reversed. If used as a fairlead to lead a control line, such as a spinnaker sheet or tweeker from a high, outboard position, load would tend to push the body into the toerail. But if the load were inboard, pulling outward, having the body inboard, being forced against the toerail could be better.

Portion 36 substantially fills and corresponds to aperture 16, it being understood that for retrofitting, precise correspondence to machine tolerances is unlikely. Filler or bedding compound could be used to fix grommet 10 in aperture 16 and fill any gaps. Flange 34, then keeps the grommet from being pulled inboard through aperture 16.

Intermediate portion 36 is shown with fastener holes 38 which receive fasteners 20. Corresponding holes 38 are shown on locking member or plate 18.

Boss 26 corresponds to either square opening 40 or square recess 42. Squares are easy to form and provide alignment of locking member or plate 18. Other shapes could be used, such as a hex or even an oval, obround or oblong shape. As shown in FIG. 11 and FIG. 12 filleted or radiused corners could be used.

Accordingly, grommet 10 is mounted in toerail 12 having main body 14 fitting in toerail aperture 16 and being held in place by locking member or plate 18, in turn being retained by fasteners 20. Bore 22 having wall 24 provides a smooth bearing or fairlead surface passing through body 14 and boss 26 such that a cordage rig passes through opening 28, that cordage 50 specifically bearing on surface 30. Main body 4 is formed having flange 34 and intermediate portion 36 with screw holes 38 to receive fasteners 20. Alternative embodiments of locking member or plate 18 utilize either a square opening 40 or square recess 42, with body 14 and specifically bore 22 and wall 24 adapted to either have fair surfaces both inboard and outboard, or an outboard fair surface contacting with an inboard fair surface on locking member 18.

While the preferred embodiment of the invention has been illustrated and described, it will be appreciated that various changes can be made therein without departing from the spirit and scope of the invention.

In accordance with my invention, I claim:

1. On a toerail affixed to a vessel, the toerail having a slot in a web:
    a grommet 10 is fitted to the toerail;
    said grommet 10 has a main body 14 which is formed and arranged to correspond to the shape of the slot;
    said body 14 has an outer flange which abuts the web on one side;
    a locking plate 18 is mounted to the main body 14 on a second side of the web, so as to capture the web;
    said body has an interior wall defining a bore 22 that is adapted to provide a lead to rigging;
    said bore 22 extends through body 10 having its wall 24 extend through to the surface of a boss 26;
    opening 28 communicates with bore 22;
    opening 28 of locking member 18 has a curved surface 30 to provide a fair lead;
    bore 22 as a curved surface continuous with wall 24 exiting boss 26;
    flat mounting plate 32 captures boss 26 and does not itself provide any fairlead.

2. The grommet of claim 1 further comprising:
    body 14 is formed to have an outboard flange 34, an intermediate portion 36 with boss 26 extending inboard on intermediate portion 36.

3. The grommet of claim 2 further comprising:
    portion 36 substantially fills and corresponds to aperture 16, and flange 34, limits the grommet as against being pulled through aperture 16.

4. The grommet of claim 3 further comprising:
    intermediate portion 36 has fastener holes 38 and plate 18 has corresponding holes 38.

5. The grommet of claim 4 further comprising:
    boss 26 is adapted to fit in one of square opening 40 or square recess 42.

6. A grommet 10 adapted to be mounted in a toerail 12 having an aperture 16 comprising:
    main body 14 is adapted to fitting in the aperture 16 and being held in place by locking member or plate 18,
    body 14 having a bore 22 extending therethrough;
    bore 22 having wall 24 adapted to provide a smooth bearing or fairlead surface passing through body 14 and boss 26 such that a cordage rig passes through opening 28;
    body 14 is formed and arranged to have a flange 34 and intermediate portion 36 with screw holes 38;
    boss 26 projects from body 14 and is rectilinear and tapered to provide tolerance when fitted to toerail 12;
    boss 26 is provided with radiused corners.

7. The grommet of claim 6 further comprising:
    a locking plate 18 is adapted to be mounted to the main body 14;
    plate 18 is formed and arranged with a rectilinear opening 40 adapted to receive boss 26;
    said opening has radiused corners.

8. A grommet 10 adapted to be mounted in a toerail 12 having an aperture 16 comprising:
    main body 14 is adapted to fitting in the aperture 16 and being held in place by locking member or plate 18,
    body 14 having a bore 22 extending therethrough;
    bore 22 having wall 24 adapted to provide a smooth bearing or fairlead surface passing through body 14 and boss 26 such that a cordage rig passes through opening 28;
    body 14 is formed and arranged to have a flange 34 and intermediate portion 36;
    boss 26 projects from body 14 and is rectilinear and tapered to provide tolerance when fitted to toerail 12;
    boss 26 is provided with radiused corners;
    a locking plate 18 is adapted to be mounted to the main body 14;
    plate 18 is formed and arranged with a rectilinear opening 40 adapted to receive boss 26;
    said opening has radiused corners.

* * * * *